US011982175B2

(12) United States Patent
Donderici et al.

(10) Patent No.: US 11,982,175 B2
(45) Date of Patent: May 14, 2024

(54) WORKFLOW AND VISUALIZATION FOR LOCALIZATION OF CONCENTRIC PIPE COLLARS

(71) Applicant: Halliburton Energy Services, Inc., Houston, TX (US)

(72) Inventors: Burkay Donderici, Pittsford, NY (US); Ilker R. Capoglu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/974,159

(22) Filed: Oct. 26, 2022

(65) Prior Publication Data

US 2023/0079375 A1 Mar. 16, 2023

Related U.S. Application Data

(62) Division of application No. 16/334,671, filed as application No. PCT/US2018/042895 on Jul. 19, 2018, now Pat. No. 11,525,349.

(Continued)

(51) Int. Cl.
*E21B 47/002* (2012.01)
*E21B 47/092* (2012.01)
(Continued)

(52) U.S. Cl.
CPC .......... *E21B 47/002* (2020.05); *E21B 47/092* (2020.05); *E21B 47/13* (2020.05);
(Continued)

(58) Field of Classification Search
CPC ....... E21B 47/002; E21B 47/092; E21B 47/13
See application file for complete search history.

(56) References Cited

U.S. PATENT DOCUMENTS 4,736,298 A 4/1988 Easton et al.
6,084,403 A 7/2000 Sinclair et al.
(Continued)

FOREIGN PATENT DOCUMENTS

WO 2013147996 10/2013
WO 2018084863 5/2018
(Continued)

OTHER PUBLICATIONS

ISRWO International Search Report and Written Opinion for PCT/US2018/042895 dated Oct. 31, 2018.

*Primary Examiner* — Lam S Nguyen
(74) *Attorney, Agent, or Firm* — John Wustenberg; C. Tumey Law Group PLLC

(57) ABSTRACT

A method and system for visualizing data to detect a collar. A method may comprise disposing an electromagnetic logging tool downhole; emitting an electromagnetic field from the transmitter; energizing a casing with the electromagnetic field to produce an eddy current; recording the eddy current from the casing with the receiver; creating a variable-density-log from the recorded eddy current; selecting a wrapping period for the variable-density-log; creating a wrapped-variable-density-log from the variable-density-log using the wrapping period; and determining at least one collar location and a pipe index with the wrapped-variable-density-log. A system for to detect a collar may comprise an electromagnetic logging tool. The electromagnetic logging tool may comprise a transmitter and a receiver, wherein the transmitter and the receiver may be a coil. The system may further comprise an information handling system.

18 Claims, 8 Drawing Sheets

Related U.S. Application Data

(60) Provisional application No. 62/542,385, filed on Aug. 8, 2017.

(51) Int. Cl.
| | |
|---|---|
| *E21B 47/13* | (2012.01) |
| *G01N 27/90* | (2021.01) |
| *G01V 3/10* | (2006.01) |
| *G01V 3/28* | (2006.01) |
| *G01V 3/30* | (2006.01) |

(52) U.S. Cl.
CPC .......... *G01N 27/9073* (2013.01); *G01V 3/10* (2013.01); *G01V 3/28* (2013.01); *G01V 3/30* (2013.01)

(56) References Cited

U.S. PATENT DOCUMENTS

| | | |
|---|---|---|
| 10,416,336 B2 | 9/2019 | Li et al. |
| 2003/0010495 A1 | 1/2003 | Mendez et al. |
| 2011/0253364 A1 | 10/2011 | Mosse et al. |
| 2011/0290011 A1 | 12/2011 | Dowla et al. |
| 2015/0047902 A1 | 2/2015 | Tang et al. |
| 2016/0178780 A1 | 6/2016 | Gibson et al. |
| 2016/0290122 A1 | 10/2016 | San Martin et al. |

FOREIGN PATENT DOCUMENTS

| | | |
|---|---|---|
| WO | 2018084864 | 5/2018 |
| WO | 2018125073 | 7/2018 |

WORKFLOW AND VISUALIZATION FOR LOCALIZATION OF CONCENTRIC PIPE COLLARS

CROSS REFERENCE TO RELATED APPLICATIONS

This application is a divisional of U.S. patent application Ser. No. 16/334,671, filed Mar. 19, 2019, which is a national stage entry of PCT/US2018/042895, filed Jul. 19, 2018, which claims the benefits of U.S. Provisional Patent Application No. 62/542,385, filed Aug. 8, 2017, which are incorporated by reference herein in their entirety.

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion monitoring tool uses electromagnetic (EM) fields to estimate pipe thickness or other corrosion indicators. As an example, an EM logging tool may collect data on pipe thickness to produce an EM log. The EM log data may be interpreted to determine the condition of production and inter mediate casing strings, tubing, collars, filters, packers, and perforations. When multiple casing strings are employed together, correctly managing corrosion detection EM logging tool operations and data interpretation may be complex.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to methods for identifying collars with electromagnetic logging tool. Electromagnetic (EM) sensing may provide continuous in situ measurements of parameters related to the integrity of pipes in cased boreholes. As a result, EM sensing may be used in cased borehole monitoring applications. EM logging tools may be configured for multiple concentric pipes (e.g., for one or more) with the first pipe diameter varying (e.g., from about two inches to about seven inches or more). EM logging tools may measure eddy currents to determine metal loss and use magnetic cores at the transmitters. The EM logging tools may use pulse eddy current (time-domain) and may employ multiple (long, short, and transversal) coils to evaluate multiple types of defects in double pipes. It should be noted that the techniques utilized in time-domain may be utilized in frequency-domain measurements. The EM logging tools may operate on a conveyance. EM logging tool may include an independent power supply and may store the acquired data on memory. A magnetic core may be used in defect detection in multiple concentric pipes.

In EM logging tools, the interpretation of the data may be based on differences between responses at two different points within the EM log, a point representing a nominal section and a point where thickness may be estimated. The response differences may be processed to determine the change in wall thickness within a tubular.

Figure 1:
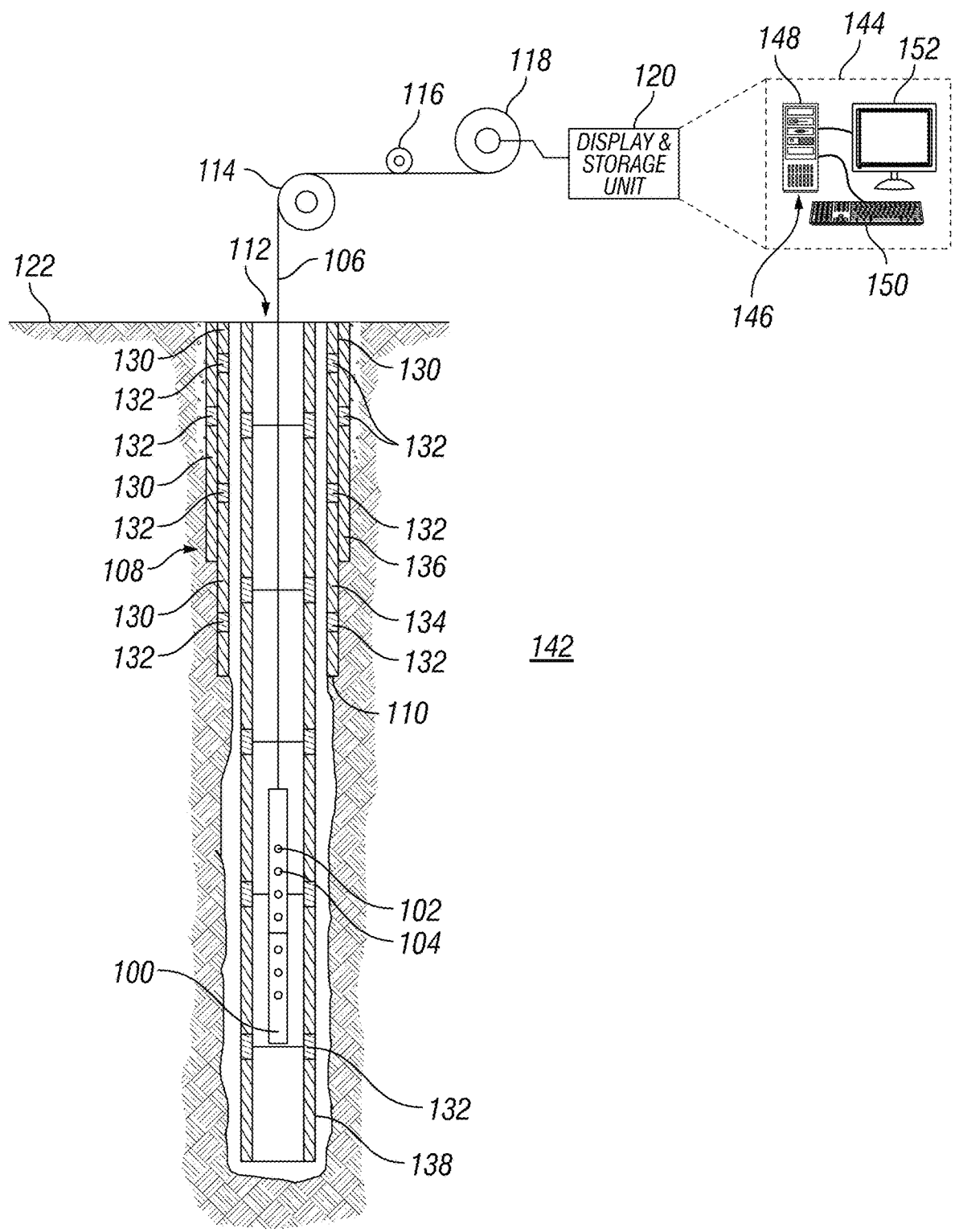
FIG. 1 illustrates an example of an EM logging tool disposed in a wellbore.

FIG. 1 illustrates an operating environment for an EM logging tool 100 as disclosed herein. EM logging tool 100 may comprise a transmitter 102 and/or a receiver 104. In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the EM logging tool 100, a digital telemetry system may be employed, wherein an electrical circuit may be used to both supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within the downhole tool assembly, and/or the data provided by EM logging tool 100 may be stored within the downhole tool assembly, rather than transmitted to the surface during logging (corrosion detection).

EM logging tool 100 may be used for excitation of transmitter 102. Transmitter 102 may transmit electromagnetic fields into subterranean formation 142. The electromagnetic fields from transmitter 102 may be referred to as a primary electromagnetic field. It should be noted that transmitter 102 may be a coil, solenoid, or permanent magnet. The primary electromagnetic fields may produce Eddy currents in casing string 108 and pipe string 138. These Eddy currents, in turn, produce secondary electromagnetic fields that may be sensed along with the primary electromagnetic fields by receivers 104. Characterization of casing string 108 and pipe string 138, including determination of pipe attributes, may be performed by measuring and processing these electromagnetic fields. Pipe attributes may include, but are not limited to, pipe thickness, pipe conductivity, and/or pipe permeability.

As illustrated, receivers 104 may be positioned on the EM logging tool 100 at selected distances (e.g., axial spacing) away from transmitters 102. It should be noted that receiver 102 may be a coil, solenoid, magnetometer, or Hall effect sensors. The axial spacing of receivers 104 from transmitters 102 may vary, for example, from about 0 inches (0 cm) to about 40 inches (101.6 cm) or about two inches (5.08 cm) to about four hundred inches (1016 cm). It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six of the receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may transmit, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Transmission of EM fields by the transmitter 102 and the recordation of signals by receivers 104 may be controlled by display and storage unit 120, which may include an information handling system 144. As illustrated, the information handling system 144 may be a component of the display and storage unit 120. Alternatively, the information handling system 144 may be a component of EM logging tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a non-transitory computer readable media 148 (e.g., optical disks, magnetic disks) that is local. The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed along with the primary electromagnetic fields by the receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be measured by receivers 104 placed at some distance on the EM logging tool 100 from transmitter 102, as shown on FIG. 1. Alternatively, the secondary electromagnetic fields may be measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times and for second casing 136 and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion. As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant and the spacing between transmitters 102 and/or receiver 104 is large enough that the contribution to the mutual impedance from the dominant (but evanescent) waveguide mode is small compared to the contribution to the mutual impedance from the branch cut component, the remote-field eddy current (RFEC) effect may be observed. In a RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}}\,t \qquad (1)$$

and the magnitude of the impedance shows the dependence:

$$\exp\left[-2\left(\sqrt{\frac{\omega\mu\sigma}{2}}\right)t\right] \qquad (2)$$

where $\omega$ is the angular frequency of the excitation source, $\mu$ is the magnetic permeability of the pipe, $\sigma$ is the electrical conductivity of the pipe, and t is the thickness of the pipe. By using the common definition of skin depth for the metals as:

$$\delta = \sqrt{\frac{2}{\omega\mu\sigma}} \qquad (3)$$

The phase of the impedance varies as:

$$\varphi \cong 2\frac{t}{\delta} \qquad (4)$$

and the magnitude of the impedance shows the dependence:

$$\exp\left[\frac{-2t}{\delta}\right] \qquad (5)$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may include frequency-domain EC techniques and time-domain EC techniques. In time-domain and frequency-domain techniques, one or more transmitters 102 may be excited with an excitation signal and receiver 104 may record the reflected excitation signal for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such corrosion or buckling.

Referring to FIG. 1, collars 132 may be another feature that may influence measurements of metal loss or gain. Collars 132 are mechanical pieces that connect segments of pipe string 138 and/or casing string 108 together. This may allow pipe string 138 and/or casing string 108 to be broken into segments (typically between 25-45 feet (7.62-13.716 meters) long) which may allow operators to store and/or transport them using readily available transportation methods. Collars 132 typically appear in the interpretation results as metal gain, since the overlapping threads associated with collars 132 result in an overall gain in the thickness of the pipe, in which a collar 132 may be disposed. Identifying collars 132 in inspection may be beneficial to an operator. For example, collars 132 may be factored into corrosion interpretation yielding better corrosion estimates. Additionally, where collars 132 may be disposed may be reported to customers as a final product. Collars 132 may be utilized as a quality check on metal loss inversion performance and where collars 132 may be disposed may help make future production optimization decisions and help identify position of various features such as chokes, vanes, and/or other pipe jewelry.

In examples in which a pipe string 138 and a single casing string 108 are utilized, identification of collars 132 may be simple. However, as the number of pipes within casing string 108 may be increased, it becomes difficult to identify collars 132 in recorded data. For example, it may become difficult to associate the features in the data to a correct pipe number and take the effect of collar 132 out for improved inversion to determine metal loss. Even though automated collar location algorithms have been proposed before, those algorithms may only provide an initial estimate for "easy" collar positions and cannot provide a reliable solution in the presence of large number of concentric pipes. On the other hand, each collar 132 that is misinterpreted by automatic collar location algorithms results in substantial amount of delay and labor time for manual correction. Information handling system 144 may be utilized to improve the workflow and visualization of data to minimize such inefficiencies in the collar locator process.

Figure 2:
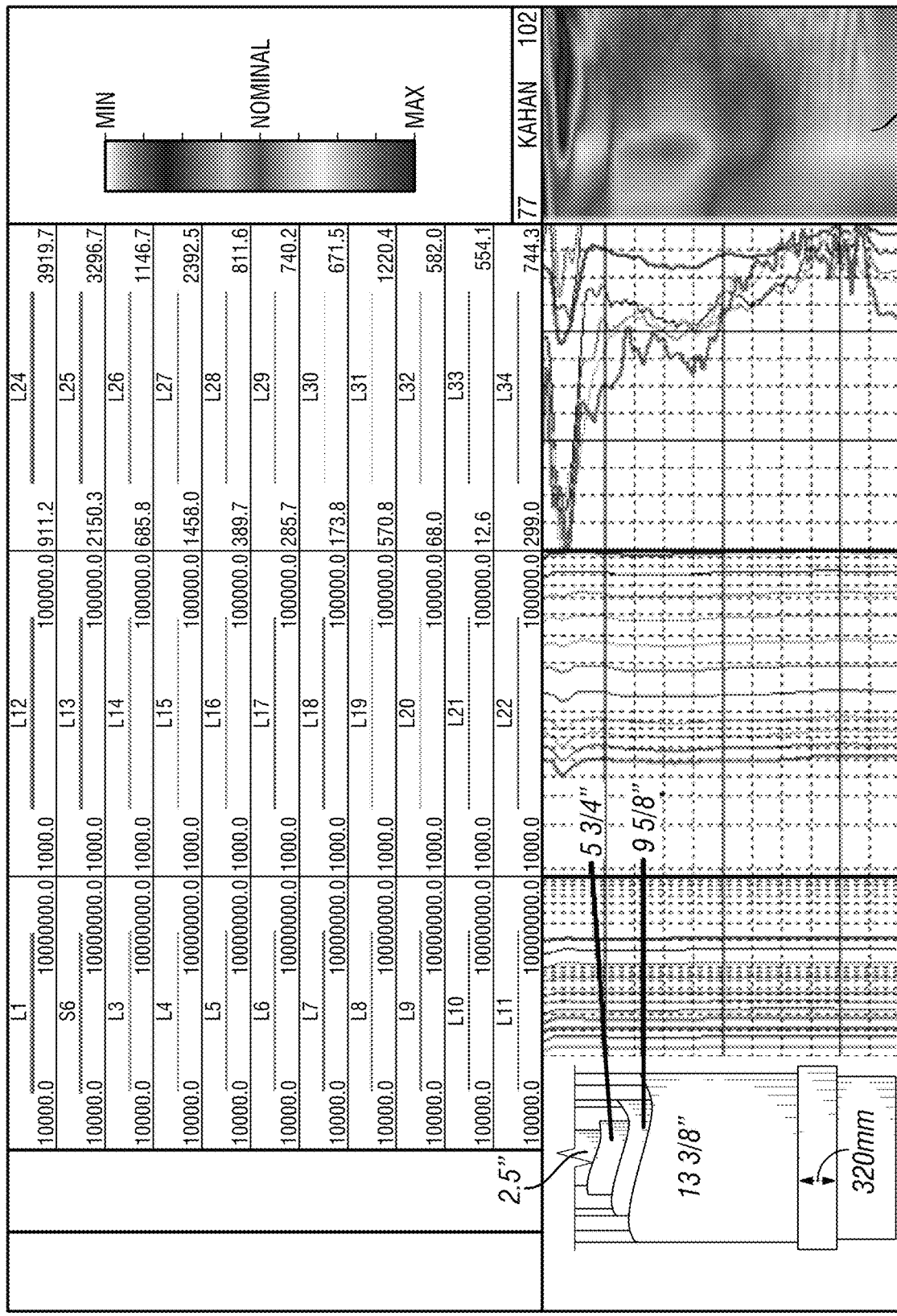
FIG. 2 illustrates an example of a visualization for locating a collar.

FIG. 2 illustrates current visualization 200 of collars 132 disposed on pipe string 138 and/or casing string 108 (Referring to FIG. 1), which may include a well plan 202, data in curve format 204, data in VDL (variable-density-log) format 206, and collar locations marked either with special markers or as blips in a curve (not illustrated). Identification of collars 132 may include, selecting a proper channel (combination of frequency and receiver) that accentuates a desired collar 132 (typically a shallow reading receiver, which may read between about four inches (10.16 cm) to about twenty inches (50.8 cm) from EM logging tool 100, and high(er) frequency, which may be above 2 Hz for a first pipe collar and for outer pipe collars a frequency of about 0.1 Hz), inspecting the "collar-like" features manually, checking for prior picks of collars 132 or "collar-like" features above and below to make sure that expected periodicity is observed, marking the center of collar 132 at the channel that was chosen, shift processing zone by an approximate collar length (30-40 feet (9.144-12.192 meters)) below and repeat. Typically the process starts from a collar 132 that may be identifiable and transitions to collars 132 that may not be identifiable. Inspecting pipes with collars 132 that may not be identifiable, identification of collars 132 that may be identifiable helps eliminate ambiguities and incorrect identification. This information may be used in a collar locating algorithm and/or inversion, discussed below, to determine the location of collars 132. Results from the collar location algorithm or inversion may be visualized by information handling system 144 for an operator.

Figure 3:
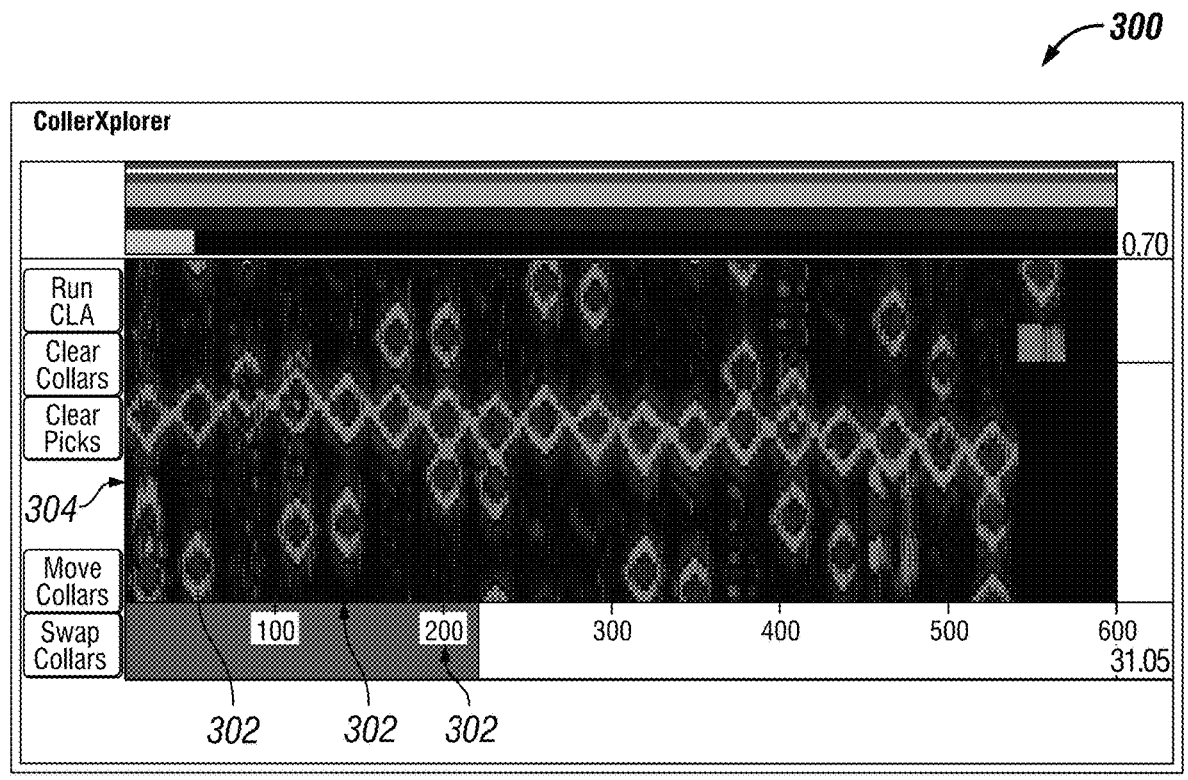
FIG. 3 illustrates an example of a Wrapped Image Visualization display.

FIG. 3 illustrates Wrapped Image Visualization 300. In this case, the VDL is broken into sections of a certain length L (L=31.05 (9.464 meters) feet in the figure) and each segment of pipe is drawn side-by-side as a different column 302 of the image. For example, the left-most column is the VDL from approximately 0 feet to 31.05 feet, and the next column is the VDL from 31.05 feet to 62.10 feet (9.46-18.928 meters), and so on. What this immediately accomplishes is that the VDL of the whole well may be shown in a single image, rather than user scrolling a typical log (such as that in FIG. 1) up and down. Wrapped Image Visualization 300 illustrates that any pipe feature, such as collar 132 (Referring to FIG. 1), with a periodicity approximately equal to L shows up as a horizontally continuous pattern in a wrapped image with periodicity L. For example, FIG. 2 shows that a L of 31.05 feet (9.464 meters) produces a horizontal pattern 304 (cutting across right in the middle) which indicates that a pipe with each collar 132 approximately 31.05 feet (9.464 meters) from each other and location of each collar 132 in that pipe may be immediately identified using a visualization with L substantially approximately equal to 31.05 feet (9.464 meters).

Figure 4A:
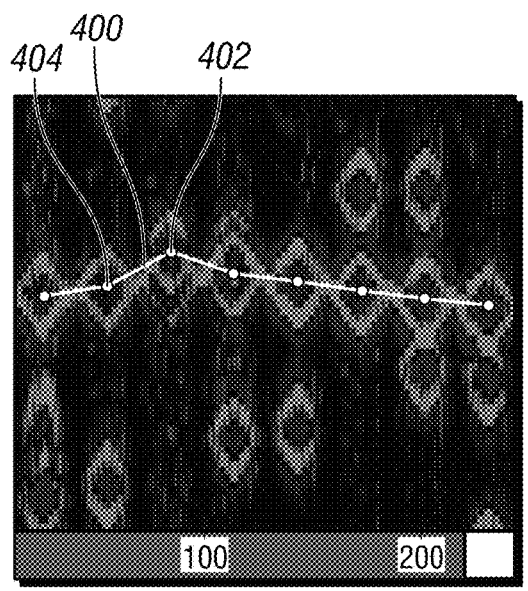
FIG. 4A illustrates an example of Wrapped Image Visualization before correcting an incorrect collar identification.
Figure 4B:
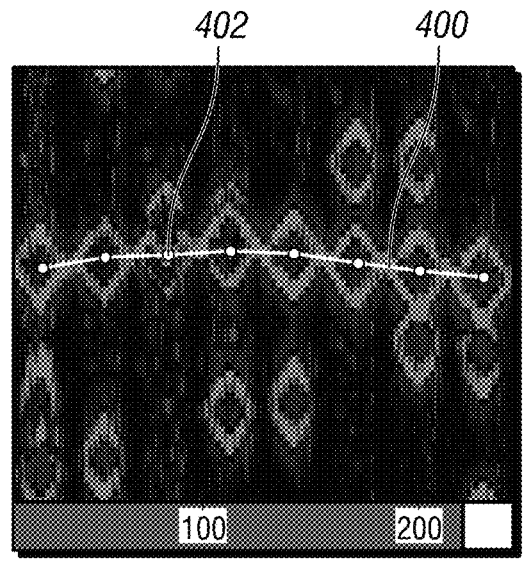
FIG. 4B illustrated an example of Wrapped Image Visualization after correcting an incorrect collar identification.

FIGS. 4A and 4B illustrates Wrapped Image Visualization 300, when "tuned" to a particular pipe periodicity, may allow an operator to resolve ambiguities associated with determining where collar 132 may be disposed on pipe string 138 and casing string 108 (Referring to FIG. 1). For example, based on the expected smooth behavior of the horizontal pattern 400 (white dotted line), determination of incorrect identification, such as third identification 402 as illustrated in FIG. 4A (each identification 404 is represented as a white dot) may be more feasible compared to using a standard non-wrapped visualization of the VDL such as that in FIG. 2. After third identification 402 is corrected, horizontal pattern 400 appears smooth as shown in FIG. 4B, verifying that the set of identifications may be feasible.

Figure 5A:
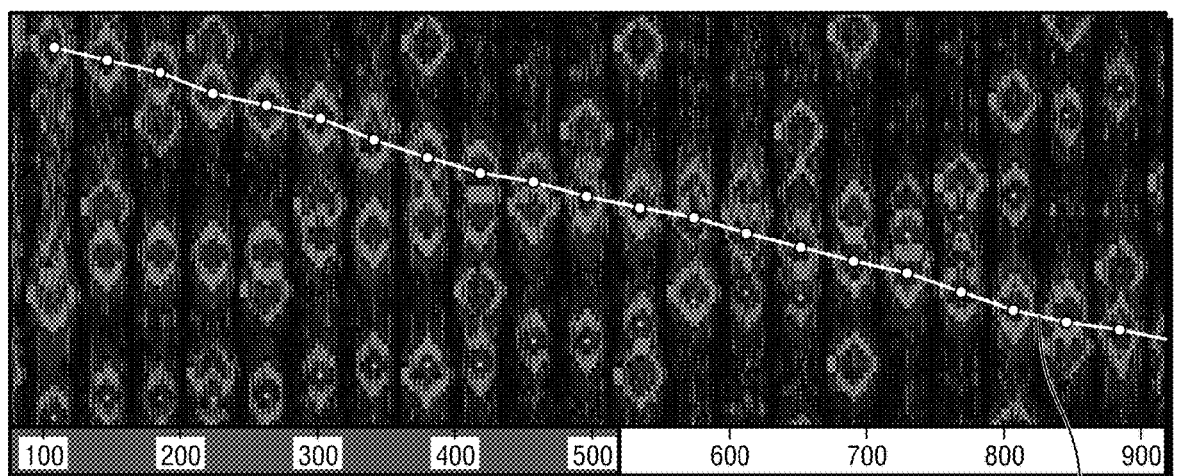
FIG. 5A illustrates another example of a tuned Wrapped Image Visualization.

FIG. 5A shows an example with a plurality of pipes, where proper collar identification 500 may be difficult without Wrapped Image Visualization 300 (Referring to FIG. 300). Wrapped Image Visualization 300 may be display an image for a first pipe, identify collars 132, and then move to a second pipe, identify collar 132, and follow this process incrementally until collars 132 in the image and in the well plan may be identified. In particular, an operator may be given a slider knob and interactively adjust wrap periodicity L until a horizontal pattern is obtained. The wrapped image may be updated frequently enough for efficient interactive "tuning" by the operator. Such tuning may also be performed by an algorithm with a matched filter.

In examples, recorded data may be scanned to identify repetitions and report the periodicity of such repetitions to the operator to allow for quicker tuning. Such information may be presented as a curve that indicates the strength of repetition at each periodicity and potentially overlay it on the slider knob.

Identifying the locations of collars 132 on at least one pipe may allow for the calculation of an ideal signature and subtract such ideal signature from the existing identified collars 132 to obtain a clearer image of where collars 132 may be disposed on pipe string 138 and/or casing string 108. For example, given $N_i$ picks for pipe i that are characterized by the depth $d_j^i$ of the pick, where j is the pick index, the ideal signature can be calculated as $$S^i(d, c) = \begin{cases} \underset{j}{MEDIAN}(VDL^i(d - d_j^i, c)) & L_{min} < L < L_{max} \\ 0 & \text{otherwise} \end{cases} \quad (6)$$

where $L_{min}$ and $L_{max}$ bounds that determine the size of the signature which may be chosen as $L_{min}=-10$ feet (3.048 meters), $L_{max}=10$ feet (3.048 meters), MEDIAN is the median function applied individually for each combination of depth and channel index c, VDL is the i'th VDL image values in Volts, Amps, Impedance, or normalized units. In case number of picks, $N_i$, is smaller than 3, a simple mean may be substituted for the median function.

An updated VDL may be constructed by subtracting the calculated ideal signature from the previous VDL as:

$$VDL^{i+1}(d, c) = VDL^i(d, c) - \sum_j S^i(d - d^i_j, c) \qquad (7)$$

Figure 5B:
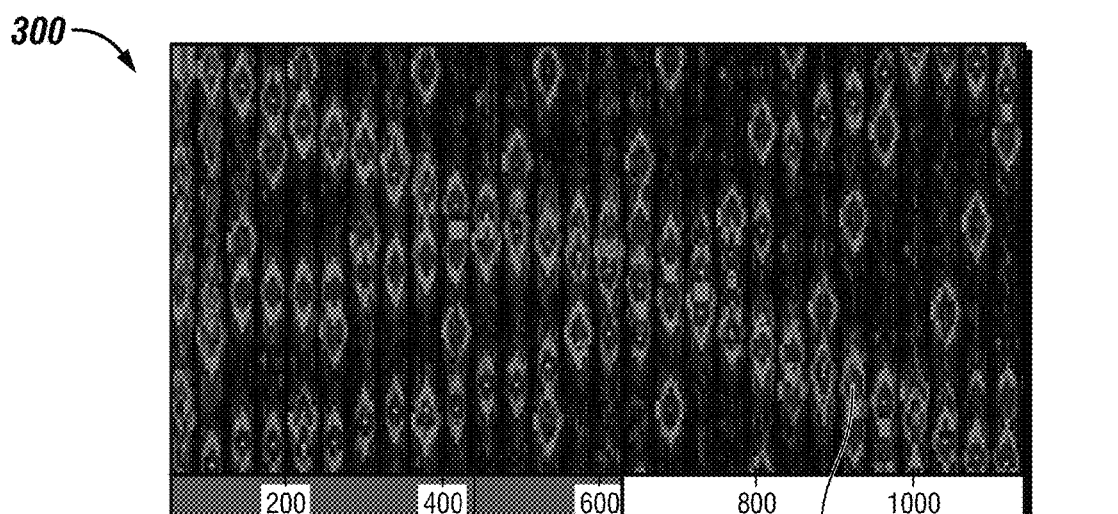
FIG. 5B illustrates another example of a tuned Wrapped Image Visualization without removal of a collar signal.
Figure 5C:
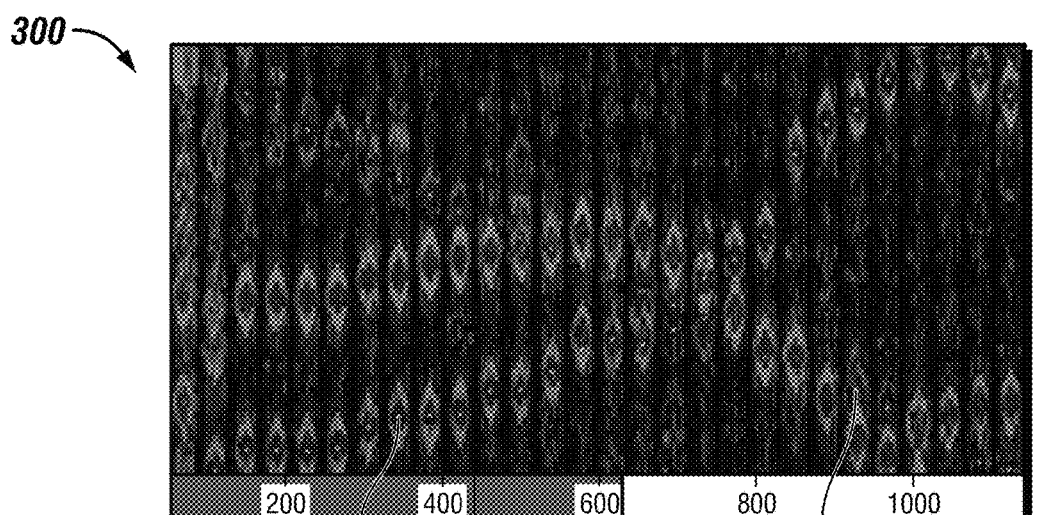
FIG. 5C illustrates another example of a tuned Wrapped Image Visualization with removal of a collar signal.

FIG. 5B shows Wrapped Image Visualization 300 before removal of collar signal and FIG. 5C illustrates Wrapped Image Visualization 300 after collar signature removal may be applied. Comparing FIGS. 5B and 5C, removing collar signatures may allow for resolving ambiguities in identification of collars 132 and increase the efficiency of the operator for collar identification 500 for deeper pipes.

Figure 6A:
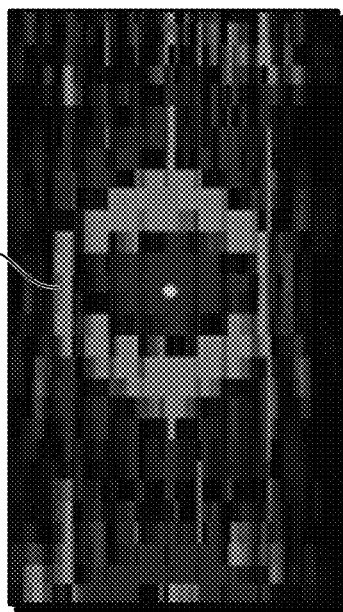
FIG. 6A illustrates a diamond pattern.

Wrapped Image Visualization 300 (Referring to FIG. 3) may utilized different pattern such as the "diamond" pattern 600, as illustrated in FIG. 6A, that may be composed by ordering the channels in a particular way in a VDL construction. Diamond pattern 600 makes it more intuitive for operators to identify collars 132 and identify positions for overlapping collars 132 (Referring to FIG. 1). Diamond patterns 600 may be formed by ordering the channels in the following way:

D1AR1F1 ... D1AR1FM ...... D1ARNF1 ... D1ARNFM D1PRNFM ... D1PRNF1 ...... D1PR1FM ... D1PR1F1
...... ...... ...... ...... ...... ......
DKAR1F1 ... DKAR1FM ...... DKARNF1 ... DKARNFM DKPRNFM ... DKPRNF1 ...... DKPR1FM ... DKPR1F1

Here DX indicates depth X, A indicates amplitude, P indicates phase, RX indicates receiver X, and FX indicates frequency X. A total of N receivers, M frequencies and K depths are assumed in the above VDL definition. As shown above, diamond pattern 600 may be constructed by ordering receivers 104 (Referring to FIG. 1) from shallow to deep for amplitude and continuing on this pattern by switching to phase with receiver 104 for deep amplitude and coming back down to receivers 104 (Referring to FIG. 1) for shallow amplitude. Ordering receivers 104 may refer to the distance between transmitters 102 and receivers 104. The closer transmitter 102 and receiver 104 are the shallower the amplitude may be. As the distance between transmitter 102 and receiver 104 is expanded the deeper the amplitude becomes. It is noted that certain similar alternate ordering may also be considered. For example, same amplitude data may be used for the right half, rather than using phase. Similarly, phase may be used for the left half of diamond pattern 600 rather than amplitude.

An alternative VDL pattern is chevron pattern 602 as described below:

peak corrected pattern 604. For double-peak corrected pattern 604, a diamond pattern 600 is performed on the recorded data and is corrected for double-peak ("ghost") indications as it was previously described above. Double-peak corrected pattern 604 may allow an operator to pinpoint the location of collar 132 and reduce the spread of collar 132 in the VDL, which may lead to better identification of collars 132 in Wrapped Image Visualization 300 (Referring to FIG. 3).

Wrapped Image Visualization 300 (Referring to FIG. 3) disclosed above may allow an operator to quickly identify periodic patterns in the data and easily and quickly pick collars 132 associated with each pipe, even in cases with a large number of pipes with overlapping collars 132. A collar removal scheme is described to incrementally remove pipe signatures for the VDL to allow easier identification of collars 132 for subsequent pipes. The diamond VDL pattern also enhances visual cues that enable the operator to identify overlapping pipes.

As mentioned above, collar locator algorithms and/or inversion may be utilized by information handling system 144 to determine the location of collars 132. This information may then be visualized on an output device 152, as described above. Workflow and inversion schemes to determine the location of a collar 132 are described below.

Figure 7:
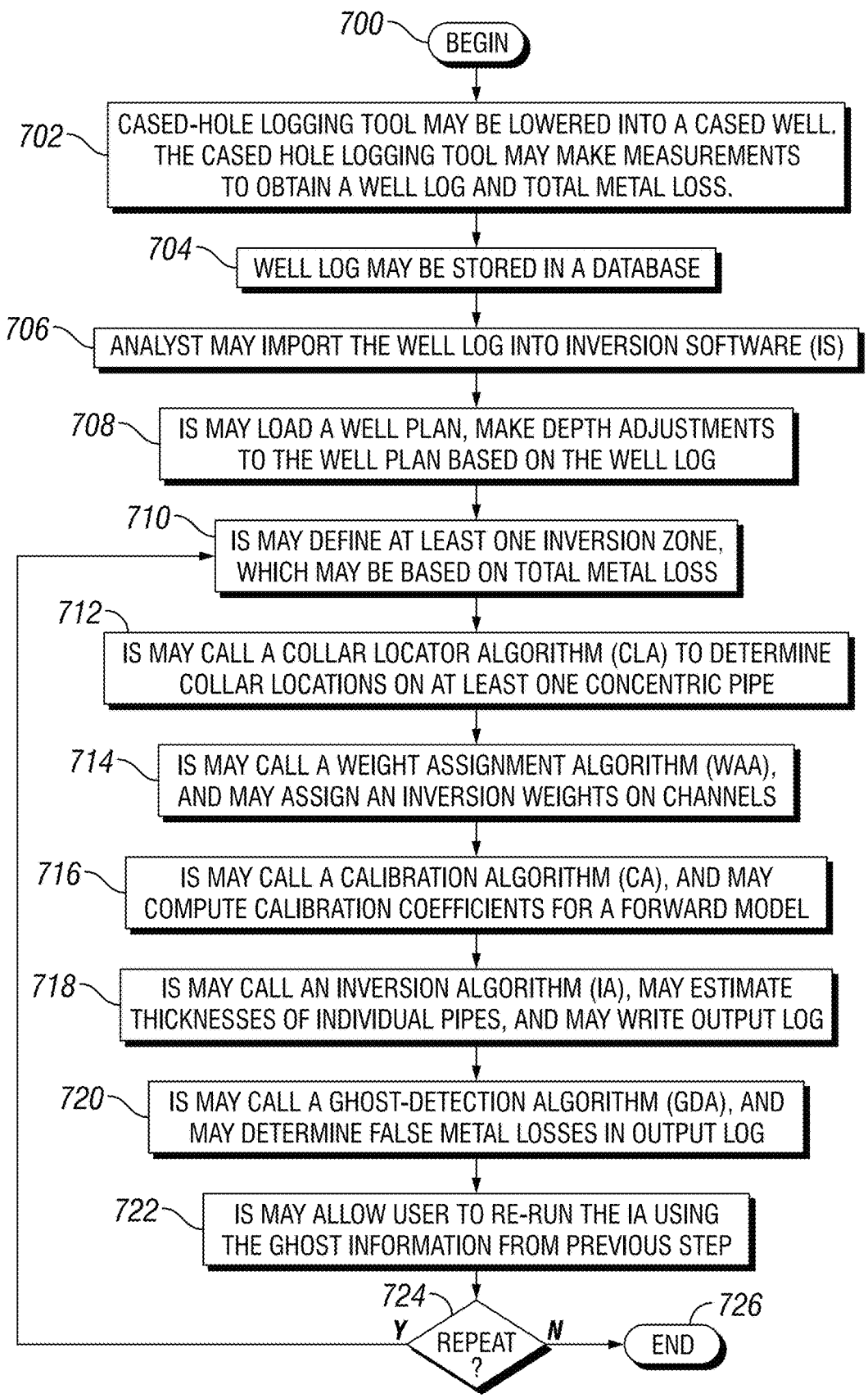
FIG. 7 illustrates an example flow chart of an automated inversion workflow for determining the location of a collar with a collar locator algorithm.

A workflow for utilizing a collar locator algorithm is shown in FIG. 7. The workflow may begin with box 700. Box 702 provides that a cased-hole logging tool (e.g., EM logging tool 100 on FIG. 1) may be lowered into a cased well (e.g., casing string 108 on FIG. 1). The cased-hole logging tool may make measurements to obtain a well log and total metal loss ("TML"). The well log may comprise induction measurements performed at least one receiver (e.g., receiver 104 on FIG. 1) and at least one frequency. The excitation may be provided by a transmitter (e.g., transmitter 102 on FIG. 1), placed at a vertical distance from the receiver (e.g., receiver 104 on FIG. 1). The TML measurement may be performed using a remote field eddy current principles, described above. TML may also be obtained by using external tools that measure only the TML.

Figure 6B:
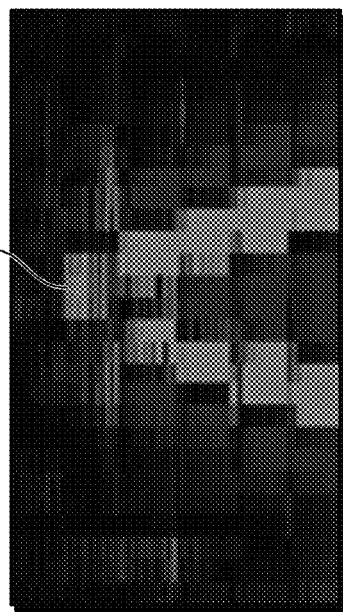
FIG. 6B illustrates a chevron pattern.
Figure 6C:
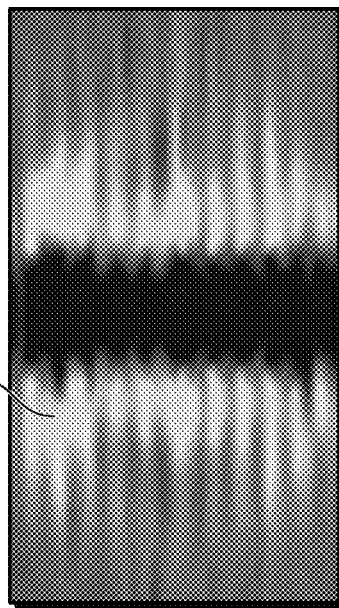
FIG. 6C illustrates a double-peak corrected pattern.
Figure 8:
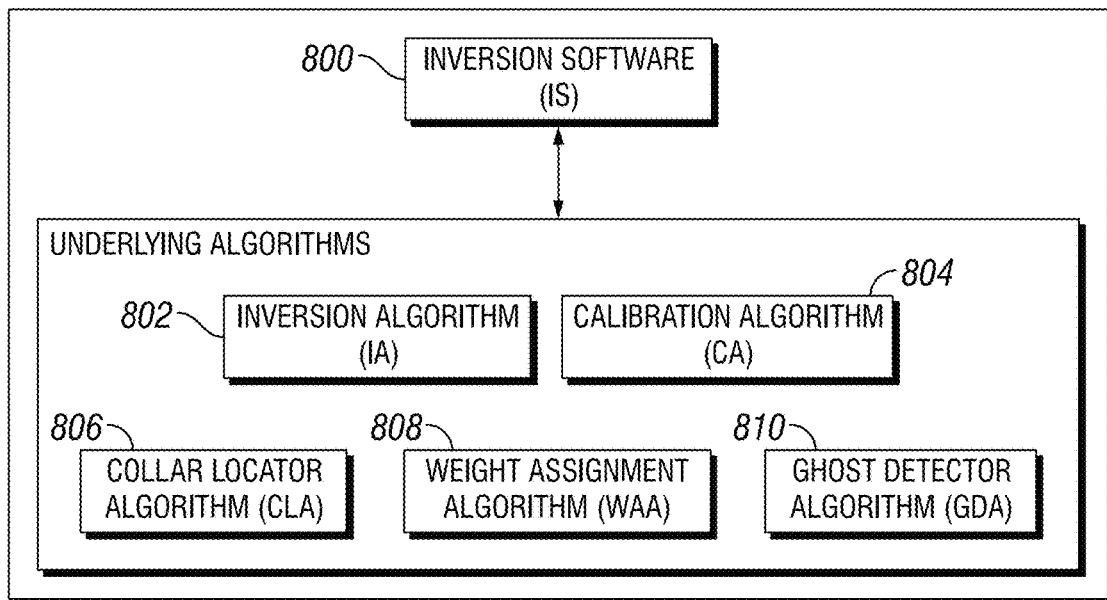
FIG. 8 illustrates an underlying algorithm that may be utilized for inversion software to locate a collar.

Box 704 provides that the well log may be stored in a database accessible through a network, or any other suitable form of a data storage medium. The well log may be read by an analyst (either over the network or by obtaining the data storage medium) at a post processing center (e.g., formation evaluation office). Box 706 provides that the analyst may import the well log into the inversion software ("IS"). A schematic description of the IS is shown in FIG. 8. Box 800 provides IS. Box 802 provides an inversion algorithm ("IA"). Box 804 provides a calibration algorithm ("CA"). Box 806 provides a collar locator algorithm ("CLA"). Box D1AR1F1 D1PR1F1 ... D1AR1FM D1PR1FM ...... D1ARNF1 D1PRNF1 ... D1ARNFM D1PRNFM
...... ...... ......
DKAR1F1 DKPR1F1 ... DKAR1FM DKPR1FM ...... DKARNF1 DKPRNF1 ... DKARNFM DKPRNFM FIG. 6A illustrates diamond pattern 600, FIG. 6B illustrates chevron pattern 603, and FIG. 6C illustrates double- 808 provides a weight assignment algorithm ("WAA"). Box 810 provides a ghost detector algorithm ("GDA"). The underlying algorithms called (e.g., utilized) by the IS may be explained in the following steps.

Referring again to FIG. 7, the IS may load the well plan that belongs to the well that has been logged. Box 708 provides that IS may load the well plan, make depth adjustments to the well plan based on the well log. The well plan may show the lengths, start and end depths of all pipes and liners in the completed well. The IS may then compare the well plan and at least one depth-based curve (e.g., a depth-based measurement such as TML) to automatically determine any depth shift that may have occurred during logging. This may be done by comparing at least one major transition point of the well plan and the depth-based curve. Transition points of the depth-based curve may be the curves where a significant change happens in the mean amplitude of the signal. After finding the optimal depth shift, the IS may correct all log curves (e.g., depth-based measurements such as receiver voltages, currents, TML, and other depth-based data) for this depth shift.

Box 710 provides that IS may define at least one inversion zone, which may be based on TML. Inversion zones may be contiguous, non-overlapping log sections where the TML may be above a certain severity threshold. This threshold may depend on the needs of the customer. The default threshold may be set at 5% to 20%, for example. In one particular implementation, the default threshold may be set at 15%.

Box 712 provides that IS may call (e.g., utilize) a CLA to determine collar locations on at least one concentric pipe. The CLA may take collar locations on the innermost pipe from a traditional casing collar locator ("CCL"). The CLA may also determine collar locations on any pipe using more advanced techniques, such as analyzing the periodic sharp signatures of collars on a well log. The final output of the CLA may be a binary (i.e., true or false) collar mask array that may indicate the presence of a collar on any pipe at any depth. The IS may use this mask to optimize the inversion at collar locations (e.g., by allowing more positive thickness changes in the metal). IS may determine updated collar locations on at least one concentric pipe in the wellbore utilizing the collar locator algorithm in the inversion software using the well log, well plan and the output log. Additionally, IS may generate an updated output log using the updated collar locations, may determine updated false metal loss in the output log using the output log, well plan and updated collar locations and may generate an updated output log using the false metal loss.

Figure 9:
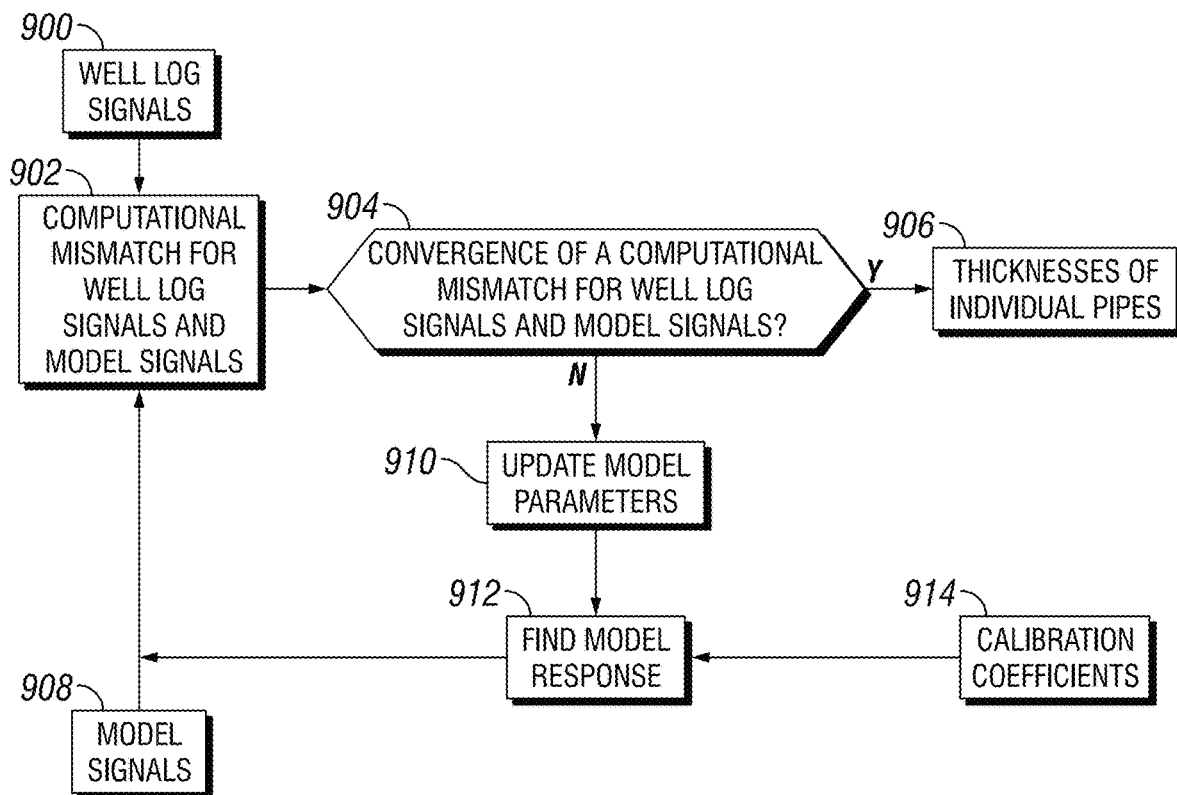
FIG. 9 illustrates an examples of a flow chart for an inversion algorithm that may be utilized to locate a collar.

Box 714 provides that the IS may call a WAA that automatically assigns weights to each channel (i.e. receiver/frequency combination) in the cost function associated with the inversion algorithm, as shown in FIG. 9. Box 900 provides well log signals. Box 902 provides a computational mismatch for the well log signals and the model signals. Box 904 provides whether there is a convergence for the computational mismatch of the well log signals and the model signals. Box 906 provides thicknesses of individual pipes. Box 908 provides model signals. Box 910 provides updating model parameters. Box 912 provides finding a model response. Box 914 provides calibrating coefficients. Different inversion zones may get different weight assignments, since the number of concentric casings may be different in each zone. The weight values may be determined by previous research on the underlying inversion algorithm. Two aspects of the inversion algorithm may include: (1) The sensitivity of each channel to the model parameters (i.e. metal thicknesses on each pipe), (2) possible detrimental factors, such as noise, model inaccuracy, and measurement inaccuracy. The WAA may assign equal weight to all of the channels.

Referring again to FIG. 7, box 716 provides that IS may call a CA and may compute calibration coefficients for a forward model. The CA is run separately inside each inversion zone. There may be a single calibration done for the entire zone, or multiple calibrations inside sub-zones of smaller lengths defined by a user of the IS. The CA may statistically analyze a well log in the inversion zone (or sub-zone), and may find a nominal zone where the pipes were not corroded and otherwise defect-free. These zones may be statistically common in a well log, since defects may be an exception, rather than a rule in any given well. The ratios between the measured voltages in a nominal zone and the simulated voltages from a forward model may be calibration coefficients, which may be applied to a forward model in subsequent inversion runs.

Box 718 provides that IS may call an IA which may estimate thicknesses of individual pipes and may write the estimated thicknesses to an output log. The IS may call an IA on each inversion zone. The IA may start with an initial guess for model parameters (i.e., metal thicknesses for each pipe), and may update these parameters using an optimization algorithm (e.g., Gauss-Newton, Levenberg-Marquardt) until a cost function is minimized. The cost function may be an absolute-square difference between a well log and a calibrated forward model result. The IS may display estimated metal thicknesses for each pipe to a user as an output log.

Box 720 provides that IS may call a GDA that may determine false metal losses in an output log. The IS may call a GDA that automatically determines ghosts, which are false metal losses that appear as sharp, periodic peaks in the output log. These apparent losses may actually be a consequence of collars; or more specifically, the inability of the inversion algorithm to fully account for their presence due to a finite vertical resolution of the defect EM logging tool 100. Many defect detection tools have a vertical resolution of several feet, while the largest collars may have a vertical resolution of about a foot (0.3048 meter). The GDA may detect ghosts in an output log automatically in the same way the CLA detects collar signatures in a well log (i.e., by exploiting a periodicity of ghost signatures). A final output of the GDA may be a binary ghost mask array that indicates a presence of a ghost (e.g., true or false) on any pipe at any depth.

Box 722 provides that IS may allow a user to re-nm an IA using the ghost information from the previous step (e.g., Box 720). The IS may present to a user (e.g., via a monitor), an option to re-run an inversion (e.g., starting from Box 718) using the ghost mask array as an inversion constraint. The inversion constraint may be that the metal losses be assigned zero at locations where the ghost mask is equal to 1, in order to remove sharp peaks in the output log. For efficiency, the inversion algorithm may be re-run only at locations where the ghost mask is 1, and the original results may be kept the same. The IS may present updated results to a user. Box 724 provides that Box 710 through Box 720 may be repeated, as necessary. Box 726 provides the end of the workflow.

Figure 10:
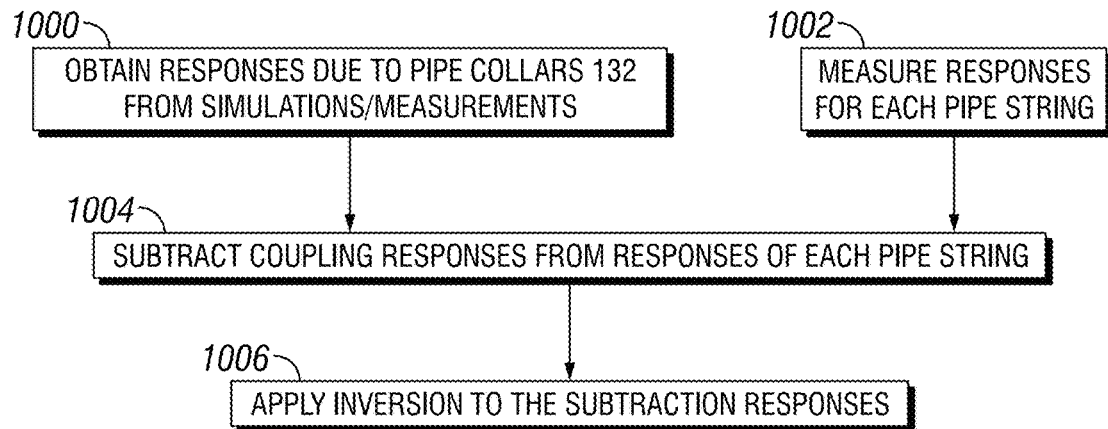
FIG. 10 illustrates an example flow chart for determining the location of a collar.

FIG. 10 illustrates a flow chart that may be used as an example method to account for coupling properties that includes subtracting the responses of collars 132 (e.g., shown on FIG. 1). At block 1000, the method may include obtaining response due to collars 132 from simulations/measurements. The response due to collars 132 may be obtained for each pipe of a concentric multi-string arrangement. To obtain coupling responses via simulation, the same pipes configuration may be simulated while putting collars 132 with known dimensions and electrical properties on the pipes one at a time to get coupling responses from each pipe. Alternatively, the collars 132 for all the pipes can be placed in the synthetic model by knowing their positions, dimensions, and properties a priori. These parameters may be also fully or partially obtained from application of a first round of inversion process on the measured data. The coupling responses may also be obtained from measurements. This may be achieved by measuring the responses of collars 132 of individual pipes separately from knowing their positions. Collars 132 responses are then subtracted from responses of sections with similar size that include defects as well. At block 1002, the method may measure response for each pipe. The measurement may include responses of defects and collars 132. At block 1004, the method may include subtracting coupling responses from responses of each pipe section. This may reduce, and possibly eliminate coupling responses from the EM log data. At block 1006, the method may include applying inversion to the subtracted responses from block 1004. The inversion may be applied directly to the subtracted responses, for example, with a modified inversion, for example, including a modified cost function that operates based on the differential responses (responses of the defected sections minus responses of the non-defected sections). Alternatively, applying inversion to the subtracted response may include, first, adding the responses at the nominal section (non-defected section) to the subtracted responses from block 1004 and then applying the inversion, wherein the cost function in the inversion algorithm does not need to be changed.

Figure 11:
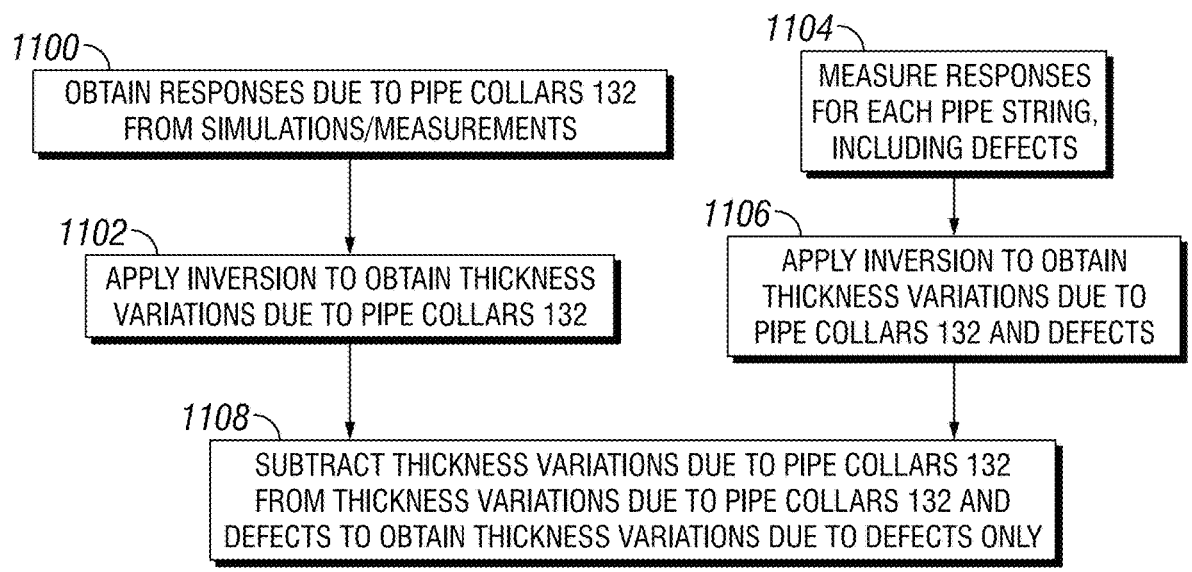
FIG. 11 illustrates another inversion example for determine the location of a collar.

FIG. 11 illustrates a flow chart as an example method to account for coupling properties that includes subtracting the thickness estimations for collars 132 (e.g., shown on FIG. 1). At block 1100, the method may include obtaining response due to collars 132 from simulations/measurements. The response due to collars 132 may be obtained for each pipe of a concentric multi-string arrangement. The response due to collars 132 may be obtained without defects. A simulation model may be employed to generate responses of receivers 104 (e.g., shown on FIG. 1) for sections of the pipes that include collars 132, but do not include defects. Alternatively, sections of the pipes may be measured that include collars 132 but do not include defects. At block 1102, the method may include applying inversion to obtain thickness variations due to collars 132. The inversion may be applied to the response due to the pipe couplings from block 1102. At block 1104, the method may measure responses for each pipe that includes defects and collars 132. At block 1106, inversion may be applied to obtain thickness variations due to collars 132 and defects. At block 1108, the method may include subtracting the thickness variations due to collars 132 from the thickness variations due to collars 132 and defects so that thickness variations due to defects only may be obtained.

The workflow and inversion schemes discussed above in FIGS. 7-11 may be utilized to determine the location and properties of collar 132. Once collar 132 is located, the information may be visualized, as described above, by information handling system 144. This visualization may allow for an operator to easily identify the location of collars 132 in a well log.

Improvements over other techniques and tools may for example be found in visualization of collars 132 as the disclosed methods and systems offer diamond shaped collar visualization which may offers a clear view of collars 132 to a user. Specifically, this may be beneficial in the case of overlapping collars 132 and high noise, which may allow a user to visually identify collars 132 which may not be picked from individual curves, or other Variable Density Logs and the like. The periodic visualization may allow the user to track collars 132 of individual pipes on individual casings and identify which pipe collar signature belongs to which pipe. This may be beneficial in cases where collar periodicity (pipe length) may be similar between different pipes and overlap, which may make it difficult to correctly identify which signatures belong to which pipe. The disclosed methods and techniques may be beneficial with the increased number of pipes downhole, as more and more signals overlap making it difficult to separate signals belonging to different pipes.

Statement 1: A method for visualizing data to detect a collar may comprise disposing an electromagnetic logging tool downhole. The electromagnetic logging tool may comprise a transmitter and a receiver. The method may further comprise emitting an electromagnetic field from the transmitter; energizing a casing with the electromagnetic field to produce an eddy current; recording the eddy current from the casing with the receiver; creating a variable-density-log from the recorded eddy current; selecting a wrapping period for the variable-density-log; creating a wrapped-variable-density-log from the variable-density-log using the wrapping period; and determining at least one collar location and a pipe index with the wrapped-variable-density-log.

Statement 2: The method of statement 1, further comprising adjusting the wrapping period until a substantially horizontal pattern is obtained.

Statement 3: The method of any preceding statement, wherein the determining the at least one collar location and the pipe index using a smoothness constraint on a line that connects adjacent identification of a plurality of collars.

Statement 4: The method of any preceding statement, wherein the adjusting the wrapping period to a second substantially different period value to obtain a second horizontal pattern corresponding to a second pipe and determining the at least one collar location on the second pipe using the second horizontal pattern.

Statement 5: The method of any preceding statement, further comprising providing visual feedback to a user during the adjusting of the wrapping period with a high repetition rate and identifying a horizontal pattern for a plurality of the wrapping periods.

Statement 6: The method of any preceding statement, wherein adjusting the wrapping period is done automatically using an algorithm that searches for an optimum horizontal repetitions.

Statement 7: The method of any preceding statement, further comprising showing the at least one collar location on the variable-density-log using a marker.

Statement 8: The method of any preceding statement, further comprising showing the at least one collar location on the variable-density-log using lines or a curve between a first collar identification and a second collar identification.

Statement 9: The method of any preceding statement, further comprising selecting at least one pipe for a collar signature removal; calculating an ideal signature for the pipes selected for the collar signature removal; subtracting the ideal signature for the pipes selected for the collar signature removal from the existing pick positions in the wrapped-variable-density-log, to obtain a collar removed wrapped-variable-density-log; and using the collar removed wrapped-variable-density-log to determine a second collar location and a second pipe index.

Statement 10: The method of statement 9, wherein the second pipe index is different from the pipe index selected for the collar signature removal.

Statement 11: The method of statements 9 or 10, further comprising adjusting an identification position, such that the identification position that gives a maximum cancellation of a collar pattern in the collar removed wrapped-variable-density-log.

Statement 12: The method of statements 9 to 11, further comprising providing visual feedback to a user during the adjustment of the identification position with a high repetition rate and identifying the identification position that gives a maximum cancellation.

Statement 13: The method of statements 9 to 12, wherein the adjusting an identification position that gives the maximum cancellation of a collar pattern is chosen as the most accurate position estimate for the collar location.

Statement 14: The method of statements 9 to 13, wherein the adjusting an identification position is performed automatically using an algorithm that searches for the maximum cancellation of the collar pattern.

Statement 15: The method of statements 9 to 14, wherein the adjusting an identification position is performed for an overlapping identification.

Statement 16: The method of any preceding claim, wherein the at least one collar location is plotted in a diamond shape pattern.

Statement 17: The method of any preceding claim, wherein a frequency channel for a plurality of receivers is placed adjacent to each other.

Statement 18: The method of any preceding claim, wherein a phase and an amplitude are placed on a first half and a second half of the wrapped-variable-density-log.

Statement 19: A system for to detect a collar may comprise: an electromagnetic logging tool comprising: a transmitter, wherein the transmitter is a coil; and a receiver, wherein the receiver is a coil; and an information handling system. The information handling system may be configured to: create a variable-density-log; select a wrapping period; create a wrapped-variable-density-log from the variable-density-log using the wrapping period; and determine at least one collar location and a pipe index with the wrapped-variable-density-log.

Statement 20, the method of statement 19, wherein the information handling machine is further capable to adjust the wrapping period until a substantially horizontal pattern is obtained and determine the at least one collar location and the pipe index using a smoothness constraint on a line that connects adjacent identification of collars.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for visualizing data to detect a collar comprising:
    disposing an electromagnetic logging tool downhole, wherein the electromagnetic logging tool comprises:
    a transmitter; and
    a receiver;
    emitting an electromagnetic field from the transmitter;
    energizing a casing with the electromagnetic field to produce an eddy current;
    recording the eddy current from the casing with the receiver;
    creating a variable-density-log from the recorded eddy current;
    selecting a wrapping period for the variable-density-log;
    creating a wrapped-variable-density-log from the variable-density-log using the wrapping period;
    determining at least one collar location and a pipe index with the wrapped-variable-density-log;
    selecting at least one pipe for a collar signature removal;
    calculating an ideal signature for the pipes selected for the collar signature removal;
    subtracting the ideal signature for the pipes selected for the collar signature removal from the existing pick positions in the wrapped-variable-density-log, to obtain a collar removed wrapped-variable-density-log; and
    using the collar removed wrapped-variable-density-log to determine a second collar location and a second pipe index.

2. The method of claim 1, wherein the second pipe index is different from the pipe index selected for the collar signature removal.

3. The method of claim 1, further comprising adjusting an identification position, such that the identification position that gives a maximum cancellation of a collar pattern in the collar removed wrapped-variable-density-log.

4. The method of claim 3, further comprising providing visual feedback to a user during the adjustment of the identification position with a high repetition rate and identifying the identification position that gives a maximum cancellation.

5. The method of claim 3, wherein the adjusting an identification position that gives the maximum cancellation of a collar pattern is chosen as the most accurate position estimate for the collar location.

6. The method of claim 3, wherein the adjusting an identification position is performed automatically using an algorithm that searches for the maximum cancellation of the collar pattern.

7. The method of claim 6 wherein the results of the algorithm are used within a workflow to generate updated output logs as computer readable media.

8. The method of claim 7 wherein the computer readable media is used within the workflow to generate visualizations of collar locations.

9. The method of claim 3, wherein the adjusting an identification position is performed for an overlapping identification.

10. A system to detect a collar comprising:
an electromagnetic logging tool comprising:
a transmitter, wherein the transmitter is a coil; and
a receiver, wherein the receiver is a coil;
an information handling system, wherein the information handling system is configured to:
create a variable-density-log from the recorded eddy current;
select a wrapping period for the variable-density-log;
create a wrapped-variable-density-log from the variable-density-log using the wrapping period;
determine at least one collar location and a pipe index with the wrapped-variable-density-log;
select at least one pipe for a collar signature removal;
calculate an ideal signature for the pipes selected for the collar signature removal;
subtract the ideal signature for the pipes selected for the collar signature removal from the existing pick positions in the wrapped-variable-density-log, to obtain a collar removed wrapped-variable-density-log; and
use the collar removed wrapped-variable-density-log to determine a second collar location and a second pipe index.

11. The system of claim 10, wherein the second pipe index is different from the pipe index selected for the collar signature removal.

12. The system of claim 10, wherein the information handling system is further configured to adjust an identification position, such that the identification position that gives a maximum cancellation of a collar pattern in the collar removed wrapped-variable-density-log.

13. The system of claim 12, wherein the information handling system is further configured to provide visual feedback to a user during the adjustment of the identification position with a high repetition rate and identifying the identification position that gives a maximum cancellation.

14. The system of claim 12, wherein the adjusting an identification position that gives the maximum cancellation of a collar pattern is chosen as the most accurate position estimate for the collar location.

15. The system of claim 12, wherein the adjusting an identification position is performed automatically using an algorithm that searches for the maximum cancellation of the collar pattern.

16. The system of claim 15 wherein the results of the algorithm are used within a workflow to generate updated output logs as computer readable media.

17. The system of claim 16 wherein the computer readable media is used within the workflow to generate visualizations of collar locations.

18. The system of claim 12, wherein the adjusting an identification position is performed for an overlapping identification.

* * * * *